Patented Dec. 20, 1949

2,491,715

UNITED STATES PATENT OFFICE 2,491,715

METHOD OF PREPARING HIGH-DENSITY MOLDED ARTICLES COMPRISING CORK AND AN ELASTOMER

Robert E. Clayton, Jr., Cranford, N. J., assignor to Standard Oil Development Company, a corporation of Delaware No Drawing. Application December 29, 1945, Serial No. 638,440

14 Claims. (Cl. 18—47.5)

This invention pertains to the preparation of cork gaskets or slabs and particularly to gaskets and slabs prepared from granulated cork particles with elastomer dispersions as the binder.

At the present time cork gaskets or slabs with an elastomer binder are prepared by the dry rubber technique, in which a comparatively large volume of cork is milled into a very small volume of binder. The large difference in volume of cork and binder used is due to the very low density of the cork. For example, in order to prepare a gasket containing equal parts by weight of cork and rubber binder, it is necessary to incorporate about twelve volumes of cork into each volume of rubber. A very considerable amount of milling or banburying must be done in order to blend the two components. This is not only time-consuming but also expensive, and, in the long milling period, the cork is broken up so that the particle size of the cork is not uniform, which in turn makes it difficult, if not impossible, to meet specifications.

A much more practical method is to use a dispersion or latex of the elastomer as binder. In this way the binder may be rapidly incorporated into the mass of cork particles in, for example, a kneader. Furthermore, the cork particles are not broken down because of the lubricating effect of the water and dispersing agents and because of the short kneading time required. However, when this mass is dried and then placed in a mold, it was found that it could not be sufficiently compressed in the usual molding equipment and that accordingly the molded product was incapable of meeting specifications.

It is the object of this invention to provide the art with a novel method of preparing cork gaskets and slabs from granular cork particles and elastomer dispersions as the binder.

It is also the object of this invention to prepare cork gaskets and slabs which are easily capable of meeting specifications from granular cork particles and elastomer dispersions or latices.

These and other objects will appear more clearly from the detailed specification and claims which follow:

It has now been found that cork gaskets and slabs which are readily capable of meeting specifications may be prepared by mixing granular cork particles and elastomer dispersions or latices as in a kneader or the like, drying the resultant batch of cork particles and binder and subjecting said dried batch to mill massing on a rubber mill or calender prior to subjecting the batch to the ordinary molding operation. The mill massing of the dried batch is accomplished by so few passes through the mill that the objections of time-consumption and cork particle disintegration mentioned above in connection with the dry rubber technique are not encountered.

The elastomer dispersions or latices which may be used as a binder for cork granules in accordance with the present invention include natural rubber latex and the artificial latices obtained by polymerizing in aqueous emulsions a conjugated diolefin such as butadiene, isoprene, piperylene or dimethylbutadiene or mixtures of such dienes or mixtures of one or more of said dienes with one or more unsaturated comonomers such as styrene, substituted styrenes such as methyl-, ethyl or chloro-styrenes, acrylonitrile, methacrylonitrile, acrylic acid esters such as methyl acrylate and methyl methacrylate, fumaric acid esters such as ethyl fumarate and unsaturated ketones such as methyl vinyl ketone, methyl isopropenyl ketone and the like. While these latices may be used as ordinarily obtained or prepared, i. e., containing from about 20–30% of elastomer solids, it is preferred to utilize creamed latices containing at least about 45% of rubber solids. The preparation of creamed synthetic rubber latices is disclosed in Serial No. 556,659, filed September 30, 1944, by Erving Arundale, now U. S. Patent No. 2,444,801.

The following is given as an example of the preparation of a cork gasket stock in accordance with the present invention.

Example

An emulsion copolymer of butadiene and acrylonitrile in the ratio of 74 parts of the former to 26 parts of the latter which had been creamed to 51% rubber solids was compounded according to the following recipe, the parts being by weight:

|  | Dry Basis Parts | Wet Basis Parts |
|---|---|---|
| Butadiene-Acrylonitrile latex cream | 100 | 196 |
| Potassium Hydroxide (10%) | 1 | 10 |
| Ammonium Alginate (2%) | 0.1 | 5 |
| Sulfur (73%) | 1.0 | 1.37 |
| Zinc Dibutyl Dithiocarbonate (50%) | 1.5 | 3 |
|  | 103.6 | 215.37 |

208 parts of the foregoing recipe (wet basis) was mixed with 100 parts by weight of granulated cork (20–30 mesh) in a kneader. The cork was thoroughly wetted with the latex compound by a 5 minute run in the kneader. The batch was then air dried overnight and subjected to mill massing on a friction mill. The massing could have been effected as well at even speed, i. e. on a calender. The mill massed product is obtained as a thin sheet and may be built up to any desired thickness. Several layers of mill massed sheets (in this particular case, 3/16 in. thick each) were easily compressed in a cork mold at 250–500 p. s. i. pressure and to 1 inch thickness and cured while still in the mold under pressure in an air oven for 2 hours at 280° F. The slab was removed from the mold and it was found that the sheet had flowed together with no signs of laminations. The resultant gasket material was subjected to a number of tests, the results of which are tabulated below:

Specific gravity _____ 1.00
Per cent volume increase after 48 hrs. @ 100° C. in 10-c. transformer oil_____ 9.9
Per cent compression after one minute loading @ 300 p. s. i. _____ 10.1
Tensile strength in p. s. i. _____ 622

Unmassed stock of same cork and latex cream compound was compressed and cured in the same molding apparatus, up to the limit of the press (approximately 2000 lbs./sq. in.). The highest specific gravity obtainable in this manner was 0.75.

The butadiene-acrylonitrile latex used above is preferred because of its speed of cure and for specific applications because of its oil resistance. Speed of cure is desirable because of the poor heat conductivity of the cork particles. However, in lieu of using butadiene-acrylonitrile latices or latex creams, the other synthetic rubber-like materials disclosed above may be used. The particular latex compounding ingredients utilized may be varied as desired.

Ordinarily about equal quantities (by weight) of rubber solids and cork are utilized for the production of gaskets in accordance with the present invention. Smaller or larger amounts of rubber solids may be used, however, depending upon the particular purposes for which the gaskets or sheets are to be used.

It may be seen therefore that I have provided the art with a novel method of preparing gasket materials easily capable of meeting specifications, particularly as to density, without destruction of cork particle size by the expedient of mill massing the cork-rubber composition prior to molding.

The foregoing description contains a limited number of embodiments of the present invention. It will be understood, however, that this invention is not limited to the specific conditions disclosed but may be varied without departing from the scope of the present invention as defined in the following claims.

What I claim and desire to secure by Letters Patent is:

1. The method of preparing high density molded cork articles which comprises mixing granular cork particles with an aqueous elastomer dispersion, drying the mixture, subjecting the dried mixture to mill massing in the absence of any additional elastomer and curing the mill massed product.

2. The method of preparing high density molded cork articles which comprises mixing granular cork particles with an aqueous elastomer dispersion, drying the mixture, subjecting the dried mixture to mill massing in the absence of any additional elastomer by passing the mixture through a rubber mill for a number of times insufficient to break down the cork and curing the mill massed product.

3. The method of preparing high density molded cork articles which comprises mixing granular cork particles with an aqueous elastomer dispersion containing at least 45% of elastomer solids, drying the mixture, subjecting the dried mixture to mill massing in the absence of any additional elastomer and curing the mill massed product.

4. The method of preparing high density molded cork articles which comprises mixing granular cork particles with an aqueous elastomer dispersion containing at least 45% of elastomer solids, drying the mixture, subjecting the dried mixture to mill massing in the absence of any additional elastomer by passing the mixture through a rubber mill for a number of times insufficient to break down the cork and curing the mill massed product.

5. The process as defined in claim 1 wherein the elastomer dispersion is obtained by the polymerization of a conjugated diolefin of from four to six carbon atoms per molecule in aqueous emulsion.

6. The process as defined in claim 2 wherein the elastomer dispersion is obtained by the polymerization of a conjugated diolefin of from four to six carbon atoms per molecule in aqueous emulsion.

7. The process as defined in claim 1 wherein the elastomer dispersion is obtained by the copolymerization of a conjugated diolefin of from four to six carbon atoms per molecule and an unsaturated comonomer in aqueous emulsion.

8. The process as defined in claim 2 wherein the elastomer dispersion is obtained by the copolymerization of a conjugated diolefin of from four to six carbon atoms per molecule and an unsaturated comonomer in aqueous emulsion.

9. The method of preparing high density molded cork articles which comprises mixing granular cork particles with about an equal weight of elastomer in the form of a latex compound obtained by polymerizing a mixture of a conjugated diolefin of from four to six carbon atoms per molecule and acrylonitrile in aqueous emulsion, drying the mixture, subjecting the dried mixture to mill massing in the absence of any additional elastomer and curing the mill massed product.

10. The method of preparing high density molded cork articles which comprises mixing granular cork particles with about an equal weight of elastomer in the form of a latex compound obtained by polymerizing a mixture of a conjugated diolefin of from four to six carbon atoms per molecule and acrylonitrile in aqueous emulsion, drying the mixture, subjecting the dried mixture to mill massing in the absence of any additional elastomer by passing the mixture several times through a rubber mill and curing the mill massed product.

11. The method of preparing high density molded cork articles which comprises mixing granular cork particles with about an equal weight of elastomer in the form of a latex compound obtained by polymerizing a mixture of a conjugated diolefin of from four to six carbon atoms per molecule and acrylonitrile in aqueous emulsion, and creaming to at least 45% rubber solids content, drying the mixture, subjecting the dried mixture to mill massing in the absence of additional elastomer and curing the mill massed product.

12. The method of preparing high density molded cork articles which comprises mixing granular cork particles with about an equal amount of elastomer in sulfur-containing latex form obtained by polymerizing a mixture of a conjugated diolefin of from four to six carbon atoms per molecule and acrylonitrile in aqueous emulsion, and creaming to at least 45% elastomer solids content and dispersing sulfur therein, drying the mixture, subjecting the dried mixture to mill massing by passing the mixture through a rubber mill for a number of times insufficient to break down the cork and curing the mill massed product.

13. The method of preparing high density molded cork articles which comprises mixing granular cork particles with an aqueous elastomer dispersion, drying the mixture, subjecting the dried mixture to mill massing by passing the mixture through a rubber mill for a number of times insufficient to break down the cork, superposing several thin sheets obtained from the mill massing and curing the superposed sheets to form a non-laminated product having a density of at least 1.0 and which consists of about equal weights of cork and elastomer.

14. The method of preparing high density molded cork articles which comprises mixing granular cork particles with an aqueous elastomer dispersion, drying the mixture, subjecting the dried mixture to mill massing by passing the mixture through a rubber mill for a number of times insufficient to break down the cork, superposing several thin sheets obtained from the mill massing, molding and curing the superposed sheets.

ROBERT E. CLAYTON, Jr.

REFERENCES CITED

The following references are of record in the file of this patent:

UNITED STATES PATENTS

| Number | Name | Date |
|---|---|---|
| 647,112 | Pearson | Apr. 10, 1900 |
| 1,184,306 | Bentley | May 23, 1916 |
| 2,087,942 | West | July 27, 1937 |
| 2,250,987 | Dunbar | July 29, 1941 |
| 2,333,403 | Youker | Nov. 2, 1943 |
| 2,339,458 | Champney | Jan. 18, 1944 |

OTHER REFERENCES

Hill: "Cork-rubber materials," Product Engineering, June 1939.